United States Patent
Messina et al.

(10) Patent No.: US 8,671,048 B2
(45) Date of Patent: Mar. 11, 2014

(54) PRE-HEDGE RULES AND TOOLS FOR CREATING PRE-HEDGE RULES

(75) Inventors: Patricia A. Messina, Chicago, IL (US); Thomas R. Zagara, LaGrange, IL (US)

(73) Assignee: Trading Technologies International, Inc, Chicago, IL (US)

( * ) Notice: Subject to any disclaimer, the term of this patent is extended or adjusted under 35 U.S.C. 154(b) by 16 days.

(21) Appl. No.: 13/445,287

(22) Filed: Apr. 12, 2012

(65) Prior Publication Data

US 2013/0275284 A1    Oct. 17, 2013

(51) Int. Cl.
*G06Q 40/04*    (2012.01)
(52) U.S. Cl.
USPC .............................................. 705/37; 705/35
(58) Field of Classification Search
USPC ...................................... 705/37, 35
See application file for complete search history.

(56) References Cited

U.S. PATENT DOCUMENTS

| | | | |
|---|---|---|---|
| 7,243,083 B2 | 7/2007 | Burns et al. | |
| 7,437,325 B2 * | 10/2008 | Kemp et al. | 705/37 |
| 7,542,940 B2 * | 6/2009 | Burns et al. | 705/37 |
| 7,644,030 B2 * | 1/2010 | Burns et al. | 705/37 |
| 7,672,896 B2 * | 3/2010 | Burns et al. | 705/37 |
| 7,747,510 B1 * | 6/2010 | Burns et al. | 705/37 |
| 2003/0004852 A1 | 1/2003 | Burns | |
| 2003/0200167 A1 | 10/2003 | Kemp, II et al. | |
| 2007/0118457 A1 * | 5/2007 | Peterffy et al. | 705/37 |
| 2010/0017323 A1 * | 1/2010 | Zimmerman | 705/37 |
| 2011/0295726 A1 * | 12/2011 | Mueller et al. | 705/30 |

* cited by examiner

*Primary Examiner* — Jagdish Patel
(74) *Attorney, Agent, or Firm* — McDonnell Boehnen Hulbert & Berghoff LLP

(57) ABSTRACT

The disclosed embodiments provide pre-hedge rules and tools for creating pre-hedge rules. An example method includes receiving an indication that a first leg of a spread trade is at least partially filled; and in response to the indication and before an order associated with a second leg of the spread trade is placed, determining whether a condition defined in a rule is satisfied and, when the condition is satisfied, performing an action defined in the rule.

21 Claims, 13 Drawing Sheets

PRE-HEDGE RULES AND TOOLS FOR CREATING PRE-HEDGE RULES

BACKGROUND

An electronic trading system generally includes a trading device in communication with an electronic exchange. The electronic exchange transmits market data to the trading device. Market data includes, for example, price data, market depth data, last traded quantity data, and/or any data related to a market for a tradeable object. In some electronic trading systems, the trading device sends trade orders to the electronic exchange. In another example, a server device, on behalf of the trading device, sends the trade orders to the electronic exchange. Upon receiving a trade order, the electronic exchange enters the trade order into an exchange order book and attempts to match quantity of the trade order with quantity of one or more contra-side trade orders.

In addition to trading single items, a user may trade more than one item according to a trading strategy. One common trading strategy is a spread and trading according to a trading strategy may also be referred to as spread trading. Spread trading may attempt to capitalize on changes or movements in the relationships between the items in the trading strategy, for example.

BRIEF DESCRIPTION OF THE DRAWINGS

Certain embodiments are disclosed with reference to the following drawings.

Figure 1:
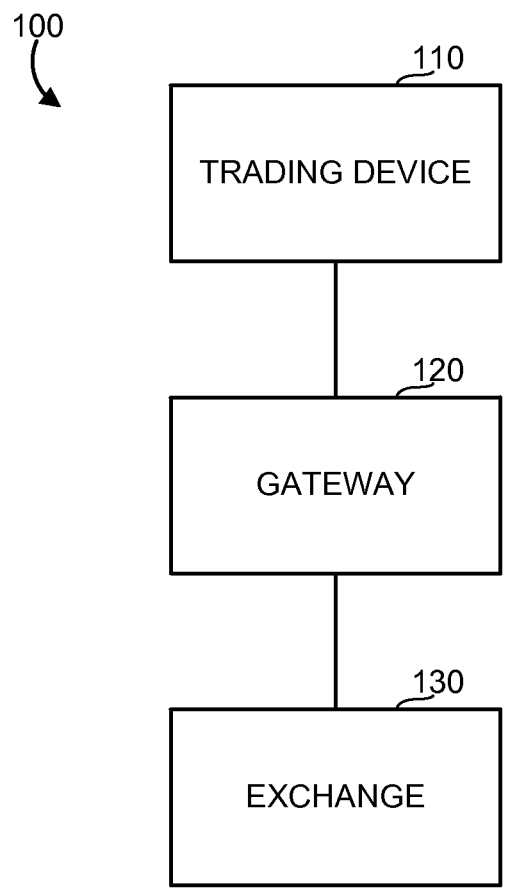
FIG. 1 illustrates a block diagram of an example electronic trading system in which certain embodiments disclosed herein may be employed.

Certain embodiments will be better understood when read in conjunction with the provided drawings, which illustrate examples. It should be understood, however, that the embodiments are not limited to the arrangements and instrumentality shown in the attached drawings.

DETAILED DESCRIPTION

I. Brief Description

Although the following discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, the disclosed embodiments may be implemented in other ways.

The disclosed embodiments relate to pre-hedge rules for spread trading. Users of the disclosed embodiments are able to create customized pre-hedge rules that are selectably applied to spread trades. The example pre-hedge rules disclosed herein are checked after a first aspect of a spread trade and prior to a second aspect of the spread trade. For example, after detecting that a first (quoting) leg of spread trade has been filled or at least partially filled, an example pre-hedge rule is checked before placement of an order for a second (hedge) leg of the spread trade. The pre-hedge rule that is checked defines one or more actions to be automatically taken given a presence of one or more conditions defined in the pre-hedge rule.

Example tools to enable creation of the pre-hedge rules are also disclosed herein. The example tools disclosed herein receive instructions from one or more users regarding the condition(s) to be checked prior to placement of, for example, a hedge order corresponding to an at least partially filled quoting leg. Further, the example tools disclosed herein receive instructions from user(s) regarding the action(s) to be taken in the presence of those condition(s). The example tools disclosed herein provide a plurality of options to the user(s) for entering the action(s) and condition(s), such as a rule builder graphical user interface having selectable pre-defined operators.

Thus, embodiments disclosed herein enable users to define customized pre-hedge rules and to selectably apply the pre-hedge rules to one or more spread trades. As described in greater detail below, the pre-hedge rules disclosed herein add a layer of logic to a spread trading strategy that was previously unavailable to users. In particular, the additional layer of logic provided by the pre-hedge rules disclosed herein is added to base logic of a spread trade. The additional layer of logic provided by the pre-hedge rules disclosed herein causes a trading device to evaluate certain condition(s) after a first (e.g., quoting) leg of a spread trade is at least partially filled and before an order for a second (e.g., hedge) leg is placed. If the condition(s) defined in the pre-hedge rule(s) are present at a time after the first leg is filled but before an order for the second leg is placed, the action(s) defined in the pre-hedge rule(s) are taken in relation to the order of the second leg.

By way of example, certain embodiments disclosed herein enable users of a spread trading strategy to inject a decision point into a spread trade at a point in the typical spread trading sequence that previously did not include a decision point. The decision point provided by the pre-hedge rules disclosed herein uses information not available to the base logic of the spread trade before the first leg is filled. Thus, the pre-hedge rules disclosed herein enable order(s) of a second leg to be placed (or not placed) based on additional and/or more up-to-date information than was previously available to base spread trade logic.

Certain embodiments provide a method including receiving an indication that a first leg of a spread trade is at least partially filled; and in response to the indication and before an order associated with a second leg of the spread trade is placed, determining whether a condition defined in a rule is satisfied and, when the condition is satisfied, performing an action defined in the rule.

Certain embodiments provide a tangible computer readable storage medium including instructions that, when executed, cause a computing device to at least receive an indication that a first leg of a spread trade is at least partially filled; and in response to the indication and before an order associated with the second leg of the spread trade is placed, determine whether a condition defined in a rule is satisfied, and, when the condition is satisfied, perform an action defined in the rule.

Certain embodiments provide an apparatus including a receiver to receive an indication that a first leg of a spread trade is at least partially filled; and a rule applicator to, in response to the indication and before an order associated with a second leg of the spread trade is placed, determine whether a condition defined in a rule is satisfied, and, when the condition is satisfied, perform an action defined in the rule.

II. Example Electronic Trading System

FIG. 1 illustrates a block diagram of an example electronic trading system 100 in which certain embodiments may be employed. The system 100 includes a trading device 110, a gateway 120, and an electronic exchange 130. The trading device 110 is in communication with the gateway 120. The gateway 120 is in communication with the exchange 130.

As used herein, the phrase "in communication with" may include in direct communication and indirect communication through one or more intermediary components.

In operation, the trading device 110 may send orders to buy or sell tradeable objects at the exchange 130. For example, a user may utilize the trading device 110 to send the orders. The orders are sent through the gateway 120 to the exchange 130. In addition, market data is sent from the exchange 130 through the gateway 120 to the trading device 110. The user may also utilize the trading device 110 to monitor this market data and/or base a decision to send an order for a tradeable object on the market data.

A tradeable object is anything which may be traded with a quantity and/or a price. For example, financial products, including stocks, options, bonds, futures, currency, warrants, funds derivatives, securities, commodities, swaps, interest rate products, index based products, traded events, goods, and collections and/or combinations of these, may be tradeable objects. A tradeable object may be "real" or "synthetic." A real tradeable object includes products that are listed and/or administered by an exchange. A synthetic tradeable object includes products that are defined by the user. For example, a synthetic tradeable object may include a combination of real (or other synthetic) products such as a synthetic spread created by a user utilizing a trading device 110. There may be a real tradeable object that corresponds and/or is similar to a synthetic trading object.

The trading device 110 may include one or more electronic computing platforms such as a hand-held device, laptop, desktop computer, workstation with a single or multi-core processor, server with multiple processors, and/or cluster of computers, for example. For example, while logically represented as a single device, trading device 110 may include a trading terminal in communication with a server, where collectively the trading terminal and the server are the trading device 110. The trading terminal may provide a trading screen to a user and may communicate commands to the server for further processing of the user's inputs through the trading screen, such as placing orders.

The trading device 110 is generally owned, operated, controlled, programmed by, configured by, or otherwise used by a user. As used herein, the phrase "user" may include, but is not limited to, a human (for example, a trader) or an electronic trading device (for example, an algorithmic trading system). One or more users may be involved in the ownership, operation, control, programming, configuration, or other use, for example.

The trading device 110 may include one or more trading applications. The trading application(s) may, for example, process market data by arranging and displaying the market data in trading and charting windows. The market data may be received from exchange 130, for example. As another example, the market data may be received from a simulation environment that provides historical data and/or simulates an exchange but does not effectuate real-world trades. This processing may be based on user preferences, for example. The trading application(s) may include an automated trading tool such as an automated spread trading tool, for example. The one or more trading applications may be distributed across one or more of the computing devices of the trading device 110. For example, certain components of a trading application may be executed on a trading workstation and other components of the trading application may be executed on a server in communication with the workstation.

The trading device 110 may include an electronic trading workstation, a portable trading device, an algorithmic trading system such as a "black box" or "grey box" system, an embedded trading system, and/or an automated trading tool, for example. For example, the trading device 110 may be a computing system running a copy of X_TRADER®, an electronic trading platform provided by Trading Technologies International, Inc. of Chicago, Ill. As another example, the trading device 110 may be a computing device running an automated trading tool such as Autospreader® and/or Autotrader™, also provided by Trading Technologies International, Inc.

As another example, the trading device 110 may include a trading application which algorithmically processes market data and includes a user interface for manual placement of orders based on the algorithmic processing or to manipulate orders that were placed automatically. An algorithmic trading application is a trading application which includes an automatically processed algorithm to perform certain actions. That is, the trading application includes an automated series of instructions to perform defined action(s). The actions may include processing market data in a particular way, placing an order, modifying an existing order, deleting an order, refraining from placing an order, selecting which tradeable object(s) to act on, determining a price to place or modify an order at, determining a quantity to place an order at or modify an order to be, determining whether an order should be to buy or sell, and delaying action for a period of time, for example.

As used herein, an algorithm (also referred to as a trading algorithm) is specified by a definition which includes logic expressions and parameters that describe the algorithm to be used in trading. Logic expressions specify the relationship between parameters and may generate more parameters. Parameters may include, for example, inputs into the logic expressions of the algorithm. The definition of an algorithm may be, at least in part, specified by the algorithmic trading application. For example, an algorithmic trading application may allow a user to only specify parameters to be used by pre-defined logic expressions. As another example, an algorithmic trading application may allow a user to specify some or all of the logic expressions and some or all of the parameters. A trading algorithm where the logic expressions are specified by a user is a user-defined trading algorithm.

Trading applications may be stored in a computer readable medium of the trading device 110. In certain embodiments, one or more components of a trading application may be stored on a trading workstation and other components of the trading application may be stored on a server in communication with the workstation. In certain embodiments, one or more components of a trading application may be loaded into the computer readable medium of the trading device 110 from another computer readable medium. For example, the trading application (or updates to the trading application) may be stored by a manufacturer, developer, or publisher on one or more CDs or DVDs, which are then provided to someone responsible for loading the application onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 ("pull distribution") and/or un-requested by the trading device 110 ("push distribution").

The trading device 110 is adapted to send orders for a tradeable object. The orders may be sent in one or more messages or data packets or through a shared memory system, for example. The trading device 110 may also be adapted to cancel orders, change orders, and/or query an exchange, for example. As another example, the trading device 110 may be adapted to send orders to a simulated exchange in a simulation environment that does not effectuate real-world trades.

The orders sent by the trading device 110 may be sent at the request of a user or automatically, for example. For example, a trader may utilize an electronic trading workstation to place an order for a particular tradeable object, manually providing one or more parameters for the order, such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the trading device 110 includes a user interface. The user interface may include one or more display devices for presenting a text-based and/or graphical interface of a trading application to a user, for example. For example, the display devices may include computer monitors, hand-held device displays, projectors, and/or televisions. The user interface may be used to specify or review parameters for an order using a trading application. The user interface may include one or more input devices for receiving input, for example. For example, the input devices may include a keyboard, trackball, two or three-button mouse, and/or touch screen. The user interface may include other devices for interacting with a user. For example, information may be audibly provided to a user through a speaker and/or received through a microphone.

In certain embodiments, a trading application includes one or more trading screens to enable a user to interact with one or more markets. Trading screens may enable users to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130, some or all of which, in turn, may be displayed with a user interface of trading device 110. Based on the received information, the trading screen may display a range of price levels and corresponding bid and ask quantities for the price levels in regard to tradeable objects. In order to provide the user with pertinent trading information, the trading screen may display a range of prices (and the corresponding bid and ask quantities) around the inside market. The information may be continuously or regularly provided to the trading application, which allows the trading application to update the trading screen with current market information. A user may use the trading screen to place buy and sell orders for tradeable objects or to otherwise trade the tradeable objects based on the displayed information, for example.

Trading screens may display one or more trading tools. Trading tools are electronic tools that allow, assist with, and/or facilitate electronic trading. Exemplary trading tools include, but are not be limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, managing trades, or analyzing the market.

In certain embodiments, the orders from the trading device 110 are sent to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 is adapted to communicate with the trading device 110 and the exchange 130. The gateway 120 facilitates communication between the trading device 110 and the exchange 130. For example, the gateway 120 may receive orders from the trading device 110 and transmit the orders to the exchange 130. As another example, the gateway 120 may receive market data from the exchange 130 and transmit the market data to the trading device 110.

In certain embodiments, the gateway 120 performs processing on data communicated between the trading device 110 and the exchange 130. For example, the gateway 120 may process an order received from the trading device 110 into a data format understood by the exchange 130. Similarly, the gateway 120 may transform market data in an exchange-specific format received from the exchange 130 into a format understood by the trading device 110. The processing of the gateway 120 may also include tracking orders from the trading device 110 and updating the status of the order based on fill confirmations received from the exchange 130, for example. As another example, the gateway 120 may coalesce market data from the exchange 130 and provide it to the trading device 110.

In certain embodiments, the gateway 120 provides services other than processing data communicated between the trading device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

In general, the exchange 130 may be owned, operated, controlled, or used by an exchange entity. Example exchange entities include the CME Group, the London International Financial Futures and Options Exchange ("LIFFE"), the IntercontinentalExchange ("ICE"), and Eurex. The exchange 130 may include an electronic matching system, such as a computer, server, or other computing device, that is adapted to allow tradeable objects, for example, offered for trading by the exchange, to be bought and sold. The electronic matching system may include a matching engine, for example. The exchange 130 may include separate entities, some which list and/or administer tradeable objects and others which receive and match orders, for example. The exchange 130 may include an electronic communication network ("ECN"), for example.

The exchange 130 is adapted to match orders to buy and sell tradeable objects. The tradeable objects may be listed for trading by the exchange 130. The orders may include orders received from the trading device 110, for example. Orders may be received from the trading device 110 through the gateway 120, for example. In addition, the orders may be received from other devices in communication with the exchange 130. That is, typically the exchange 130 will be in communication with a variety of other trading devices (which may be similar to trading device 110) that also provide orders to be matched.

The exchange 130 is adapted to provide market data. The market data may be provided in one or more messages or data packets or through a shared memory system, for example. The market data may be provided to the trading device 110, for example. The market data may be provided to the trading device 110 through the gateway 120, for example. The market data may include data that represents the inside market, for example. The inside market is the lowest sell price (also referred to as the "best ask") and the highest buy price (also referred to as the "best bid") at a particular point in time (since the inside market may vary over time). The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on both sides of the inside market. As another example, market depth may be provided for the first ten price levels at which quantity is available in the market. The market data may also include information such as the last traded price (LTP), the last traded quantity (LTQ), and order fill information.

In certain embodiments, the system 100 includes more than one trading device 110. For example, multiple trading devices similar to the trading device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the trading device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the trading device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above. Each gateway may be in communication with one or more different exchanges, for example. Such an arrangement may allow one or more trading devices 110 to trade at more than one exchange (and/or provide redundant connections to multiple exchanges), for example.

In certain embodiments, the trading device 110 includes one or more computing devices or processing components. In other words, the functionality of the trading device 110 may be performed by more than one computing device. For example, one computing device may generate orders to be sent to the exchange 130 while another computing device may provide a graphical user interface to a user. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the trading device 110. For example, the components of the gateway 120 may be part of the same computing platform as the trading device 110. As another example, the functionality of the gateway 120 may be performed by components of the trading device 110. In certain embodiments, the gateway 120 is not present. Such an arrangement may occur when the trading device 110 does not need to utilize the gateway 120 to communicate with the exchange 130, for example. For example, if the trading device 110 has been adapted to communicate directly with the exchange 130.

In certain embodiments, the gateway 120 is physically located at the same site as the trading device 110. In certain embodiments, the gateway 120 is physically located at the same site as the exchange 130. In certain embodiments, the trading device 110 is physically located at the same site as the exchange 130. In certain embodiments, the gateway 120 is physically located at a site separate from both the trading device 110 and the exchange 130.

In certain embodiments, the system 100 may include other devices that are specific to the communications architecture such as middleware, firewalls, hubs, switches, routers, exchange-specific communication equipment, modems, security managers, and/or encryption/decryption devices.

III. Example Computing Device

Figure 2:
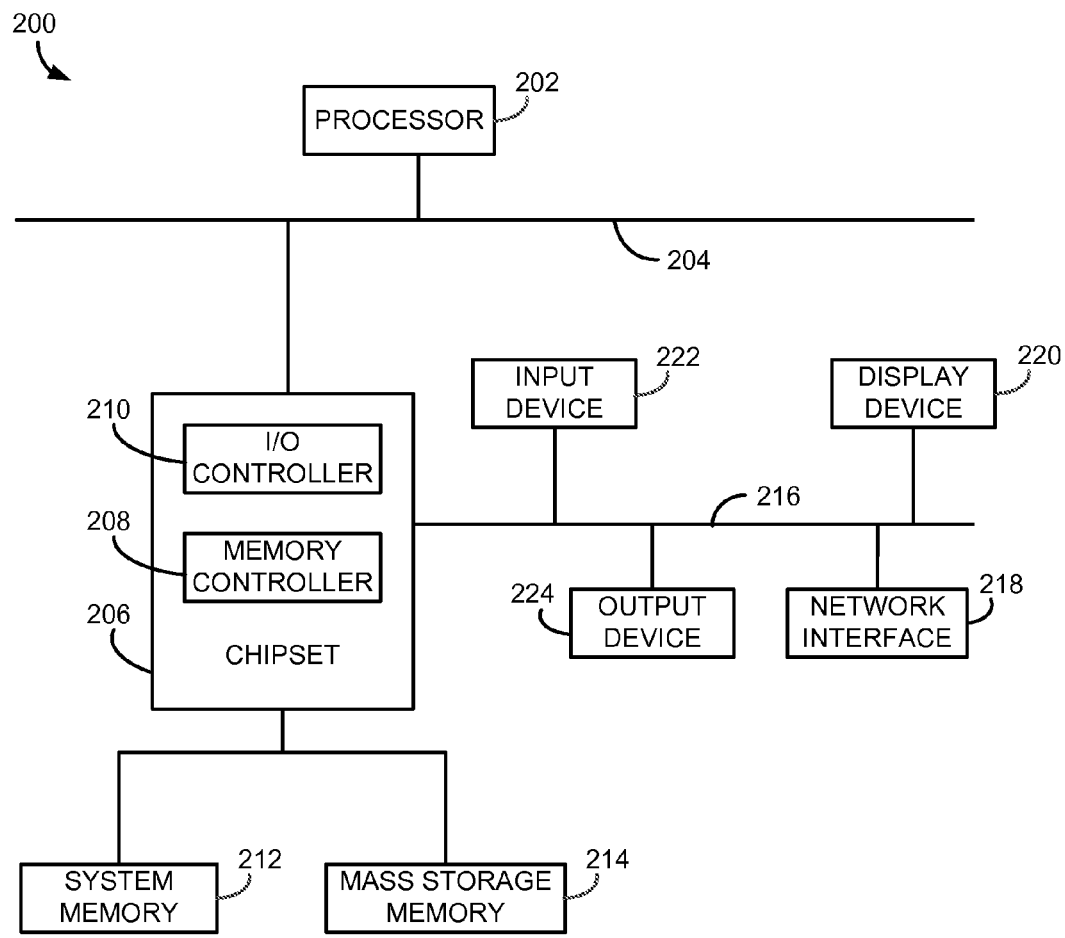
FIG. 2 illustrates a block diagram of an example computing device that may be used to implement the disclosed embodiments.

FIG. 2 illustrates a block diagram of an example computing device 200 that may be used to implement the disclosed embodiments. The trading device 110 of FIG. 1 may include one or more computing devices 200, for example. The gateway 120 of FIG. 1 may include one or more computing devices 200, for example. The exchange 130 of FIG. 1 may include one or more computing devices 200, for example.

The computing device 200 includes a processor 202, an interconnection bus 204, a chipset 206, a memory controller 208, an input/out (I/O) controller 210, a system memory 212, a mass storage memory 214, an I/O bus 216, a network interface 218, a display 220, an input device 222, and an output device 224. The computing device 200 may include additional, different, or fewer components. For example, multiple buses, multiple processors, multiple memory devices, multiple network interfaces, multiple display devices, multiple input devices, multiple output devices, or any combination thereof, may be provided. As another example, the computing device 200 may not include an output device 224 separate from the display device 220. As another example, the computing device 200 may not include a display device 220. As another example, the computing device 200 may not include an input device 222. Instead, for example, the computing device 200 may be controlled by an external or remote input device via the network interface 218.

The computing device 200 includes a processor 202 that is coupled to an interconnection bus 204. The interconnection bus 204 may include a communication bus, channel, network, circuit, switch, fabric, or other mechanism for communicating data between components in the computing device 200. The interconnection bus 204 may be communicatively coupled with and transfer data between any of the components of the computing device 200. For example, during an installation process of a trading application, one or more computer-readable instructions that are to be executed by the processor 202 may be transferred from the input device 222 and/or the network interface 218 to the system memory 212 and/or the mass storage memory 214. When the computing device 200 is running or preparing to run the trading application stored in the system memory 212 and/or the mass storage memory 214, the processor 202 may retrieve the instructions from the system memory 212 and/or the mass storage memory 214 via the interconnection bus 204.

The processor 202 may be a processor, processing unit, or microprocessor, for example. The processor 202 may include one or more general processors, digital signal processors, application specific integrated circuits, field programmable gate arrays, analog circuits, digital circuits, programmed processors, and/or combinations thereof, for example. The processor 202 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. The computing device 200 may be a multi-processor system and, thus, may include one or more additional processors that are communicatively coupled to the interconnection bus 204.

The processor 202 may be operable to execute logic encoded in one or more tangible media, such as the system memory 212, the mass storage memory 214, and/or via the network interface 218. As used herein, logic encoded in one or more tangible media includes instructions that are executable by the processor 202 or a different processor. The logic may be stored as part of software, hardware, integrated circuits, firmware, and/or micro-code, for example. The logic may be received from an external communication device via a communication network, for example, connected to the Internet. The processor 202 may execute the logic to perform the functions, acts, or tasks illustrated in the figures or described herein.

The processor 202 of FIG. 2 is coupled to the chipset 206, which includes the memory controller 208 and the I/O controller 210. A chipset typically provides I/O and memory management functions as well as a plurality of general purpose and/or special purpose registers and timers that are accessible or used by one or more processors coupled to the chipset 206. The memory controller 208 performs functions that enable the processor 202 (or processors if there are multiple processors) to access the system memory 212 and the mass storage memory 214.

The system memory 212 and the mass storage memory 214 may be one or more tangible media, such as computer readable storage media, for example. The system memory 212 may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, any other tangible data storage device, any combination thereof. The mass storage memory 214 may include various types of mass storage devices including, for example, a hard disk drive, optical media, magnetic tape, any other tangible data storage device, or any combination thereof. In certain embodiments, the system memory 212 and the mass storage memory 214 are non-transitory.

The system memory 212 and the mass storage memory 214 may be a single memory module, for example. The system memory 212 and the mass storage memory 214 may be adjacent to, part of, programmed with, networked with, and/or remote from processor 202, such that data stored in the system memory 212 and the mass storage memory 214 may be retrieved and processed by the processor 202, for example. The system memory 212 and the mass storage memory 214 may store instructions that are executable by the processor 202. The instructions may be executed to perform one or more of the acts or functions described herein or shown in the figures.

The I/O controller 210 performs functions that enable the processor 202 to communicate with the network interface 218, the display 220, the input device 222, and the output device 224 through an I/O bus 216. While the memory controller 208 and the I/O controller 210 are depicted in FIG. 2 as separate blocks within the chipset 206, the functions performed by these blocks may be integrated within a single semiconductor circuit or may be implemented using two or more separate integrated circuits. One or more of the components of the computing device 200 may be implemented as a system on a chip (for example, a system on a chip in an IPHONE™).

The network interface 218 may be a one-way or two-way communication coupling. Accordingly, the network interface 218 may communicatively connect one, two, or more communication networks or devices. For example, the interconnection bus 204 may be coupled with a gateway similar to gateway 120 of FIG. 1 discussed above via the network interface 218, such that one, some, or all of the components of the computing device 200 are accessible or may communicate with the gateway. As another example, the network interface 218 may couple the interconnection bus 204 with other communication networks. The network interface 218 may be, for example, an integrated services digital network (ISDN) card or a modem to provide a data communication connection. As another example, network interface 218 may be a local area network (LAN) card to provide a data communication connection to a compatible LAN, for example, connected to the Internet. Wireless links may also be implemented. The network interface 218 may send and receive electrical, electromagnetic, or optical signals that carry analog or digital data streams representing various type of information, for example.

The display device 220 may include a visual output device, cathode ray tube (CRT) display, electronic display, electronic paper, flat panel display, light-emitting diode (LED) display, electroluminescent display (ELD), plasma display panel (PDP), liquid crystal display (LCD), thin-film transistor display (TFT), organic light-emitting diode display (OLED), surface-conduction electron-emitter display (SED), laser television, carbon nanotubes, nanocrystal display, head-mounted display, projector, three-dimensional display, and/or transparent display device, for example.

The display device 220 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 220 and/or the input device 222 may be used to interact with the trading screen, for example.

The input device 222 may include a keyboard, mouse, microphone, touch-screen, trackball, keypad, joystick, and/or other device for providing input, for example. The input device 222 may be used, for example, to provide command selections to processor 202. For example, the input device 222 may be a mouse that is used to control a cursor displayed on a trading screen. The mouse may include one or more buttons for selection and control, for example.

The output device 224 may include a keyboard, mouse, speakers, touch-screen, trackball, keypad, haptic device or system, joystick, and/or other device for providing output, for example. For example, the output device 224 may be used to output one or more signals, such as a haptic signal or an audio signal, to a user. While the input device 222 and output device 224 are depicted in FIG. 2 as separate blocks, the functions performed by these blocks may be integrated into a single I/O device.

IV. Strategy Trading

In addition to buying and/or selling a single tradeable object, a user may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

An automated trading tool may be utilized to trade according to a trading strategy, for example. For example, the automated trading tool may be Autospreader™ provided by Trading Technologies International, Inc. of Chicago, Ill.

A trading strategy defines a relationship between two or more tradeable objects to be traded. Each tradeable object being traded as part of a trading strategy may be referred to as a leg or outright market of the trading strategy.

When the trading strategy is to be bought, a definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 3:
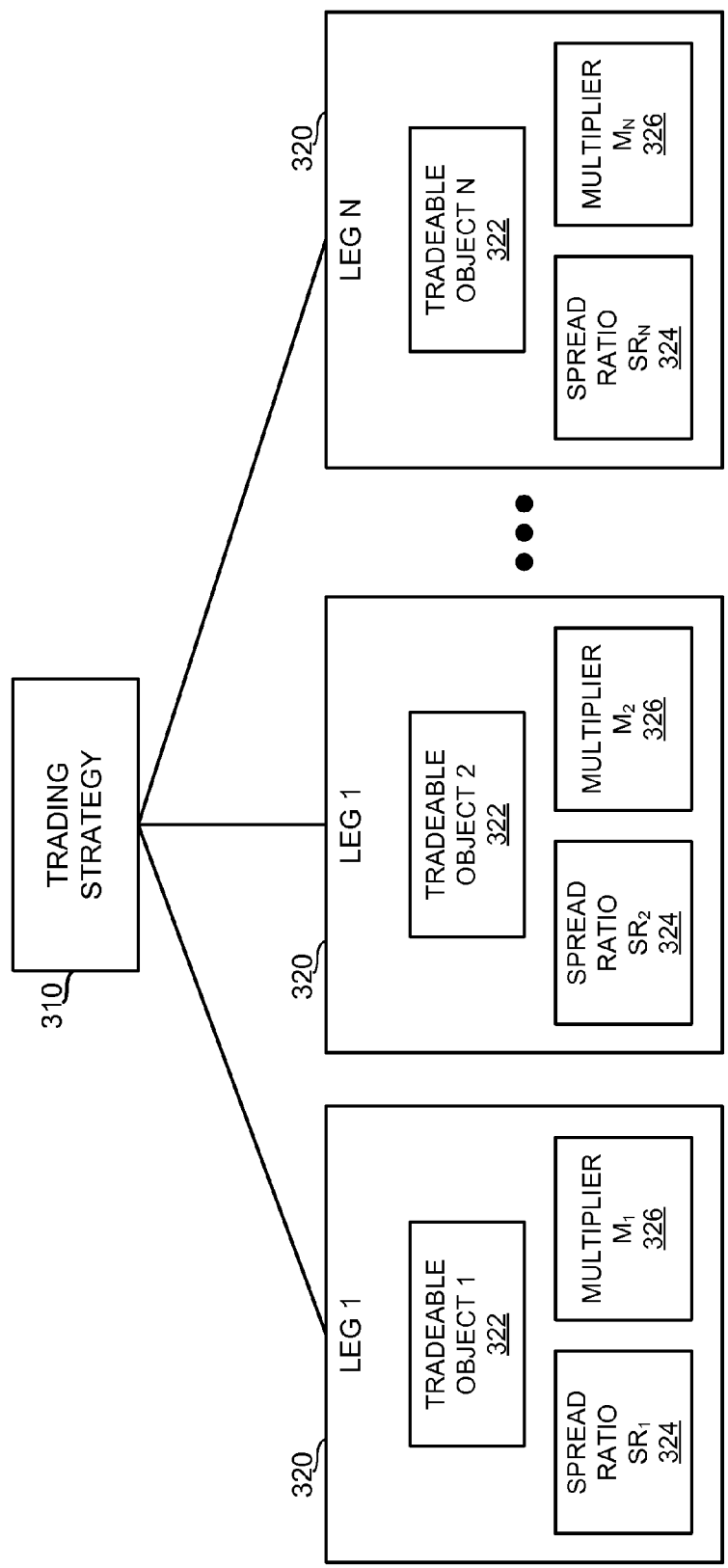
FIG. 3 illustrates a block diagram of a trading strategy which may be employed with the disclosed embodiments.

FIG. 3 illustrates a block diagram of a trading strategy 310 which may be employed with certain embodiments of the present inventions. The trading strategy 310 includes "N" legs 320. The trading strategy 310 defines the relationship between the tradeable objects 322 for each of the legs 320 using the spread ratios 324 and multipliers 326 associated with each of the legs 320.

Once defined, the tradeable objects 322 in the trading strategy 310 may then be traded together according to the defined relationship. For example, assume that the trading strategy 310 is a spread with two legs 320. Leg 1 is for tradeable object A and Leg 2 is for tradeable object B. In addition, assume that the spread ratios 324 and multipliers 326 associated with Legs 1 and 2 are "1" and "−1," respectively. That is, the spread 310 is defined such that when the spread 310 is bought, 1 unit of tradeable object A is bought (positive spread ratio, same direction as the spread) and 1 unit of tradeable object B is sold (negative spread ratio, opposite direction of the spread). As mentioned above, typically in spread trading the opposite of the definition applies. That is, when the definition for the spread 310 is such that when the spread 310 is sold, 1 unit of tradeable object A is sold (positive spread ratio, same direction as the spread) and 1 unit of tradeable object B is bought (negative spread ratio, opposite direction of the spread).

The price for the trading strategy 310 is determined based on the definition. In particular, the price for the trading strategy 310 is typically the sum of price of the tradeable object 322 multiplied by the multiplier 326 for each of the legs 320 of the trading strategy 310. The price for a trading strategy may be affected by price tick rounding and/or pay-up ticks. However, both of these implementation details are beyond the scope of this discussion and are well-known in the art.

A real spread may be listed at an exchange, such as exchange 130 of FIG. 1, as a tradeable product. In contrast, a synthetic spread may not be listed as a product at an exchange, but rather the various legs of the spread are tradeable at one or more exchanges. For the purposes of the following discussion, the trading strategy 310 is discussed as a synthetic trading strategy. However, similar techniques to those discussed below may also be applied by an exchange when a real trading strategy is being traded.

Continuing the example from above, if it is expected or believed that tradeable object A typically has a price 10 greater than tradeable object B, then it may be advantageous to buy the spread whenever the difference in price between tradeable objects A and B is less than 10 and sell the spread whenever the difference is greater than 10. As an example, assume that tradeable object A is at a price of 45 and tradeable object B is at a price of 40. The current spread price may then be determined to be (1)(45)+(−1)(40)=5, which is less than the typical spread of 10. Thus, a user may buy 1 unit of the spread, which results in buying 1 unit of tradeable object A at a price of 45 and selling 1 unit of tradeable object B at 40. At some later time, the typical price difference may be restored and the price of tradeable object A is 42 and the price of tradeable object B is 32. At this point, the price of the spread is now 10. If the user sells 1 unit of the spread to close out his position (that is, sells 1 unit of tradeable object A and buys 1 unit of tradeable object B), he has made a profit on the total transaction. In particular, while the user bought tradeable object A at a price of 45 and sold at 42, losing 3, the user sold tradeable object B at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread 310 to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 310 at a desired price, the automated trading tool may automatically place an order (also referred to as quoting an order) for one of the tradeable objects 322 of the trading strategy 310 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned on price, lean price, or lean level. Typically, if there is sufficient quantity available, the target price may be the best bid price when selling and the best ask price when buying. The target price may be different than the best price available if there is not enough quantity available at that price or because it is an implied price, for example. As the leaned on price changes, the price for the order in the quoting leg may also change to maintain the desired strategy price.

The leaned on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, a conventional automated trading tool then submits an order in the hedge leg to complete the strategy. This order may be referred to as an offsetting or hedging order. The offsetting order may be placed at the leaned on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

By way of example, as described in detail below, in contrast to the conventional automated trading tool that submits an order for a second leg (e.g., a hedge leg) immediately after a first leg (e.g., a quoting leg) is filled, example pre-hedge rules disclosed herein are checked after then the first leg is at least partially filled but before the order of the second leg is submitted.

V. Pre-Hedging Rules

Example pre-hedge rules disclosed herein provide an additional decision point or layer of logic to the process of filling a spread order. In particular, one or more conditions defined in the example pre-hedge rules disclosed herein are checked after, for example, a quoting leg is filled but before an order in the hedge leg is placed. For spread orders having more than two legs, one or more conditions defined in the example pre-hedge rules disclosed herein are checked at additional or alternative times. For example, when implemented in connection with a spread order having one quoting leg and first and second hedge legs, condition(s) defined in the example pre-hedge rules disclosed herein may be checked after the quoting leg is at least partially filled but before an order in the first hedge leg is placed. Additionally or alternatively, condition(s) defined in the example pre-hedge rules disclosed herein may be checked after the first hedge leg is at least partially filled but before an order in the second hedge leg is placed. In other examples, when implemented in connection with a spread order having first and second quoting legs and a hedge leg, condition(s) defined in the example pre-hedge rules disclosed herein may be checked after the first and second quoting legs are at least partially filled but before an order in the hedge leg is placed. Additionally or alternatively, condition(s) defined in the example pre-hedge rules disclosed herein may be checked after only one of the first and second quoting legs is at least partially filled but before the hedge leg is placed. As spread trades can have many different combinations of quoting leg(s) and/or hedge leg(s), the additional logic point provided by the example pre-hedge rules disclosed herein can inserted at any suitable point in the spread trade sequence.

If the condition(s) defined in the example pre-hedge rules disclosed herein are met, one or more actions defined in the example pre-hedge rules are taken in relation to one or more aspects of the spread trade, such as the hedge order. By checking condition(s) defined in the pre-hedge rules disclosed herein at this time, users can insert an evaluation of, for example, market conditions at a stage of a spread trade previously unavailable. When using conventional systems, users rely on evaluations of market conditions at the moment a spread trade is configured and placed and/or the quoting order fill price. In other words, these users rely on evaluations of market conditions at or before an order for the quoting leg is submitted. Certain embodiments disclosed herein enable users to implement a trading strategy that evaluates markets conditions when the trading strategy is placed and after a portion (for example, a quoting leg of a spread) of the trading strategy has been at least partially filled. As a result, a user can utilize a trading strategy that adapts to changing market conditions.

Figure 4:
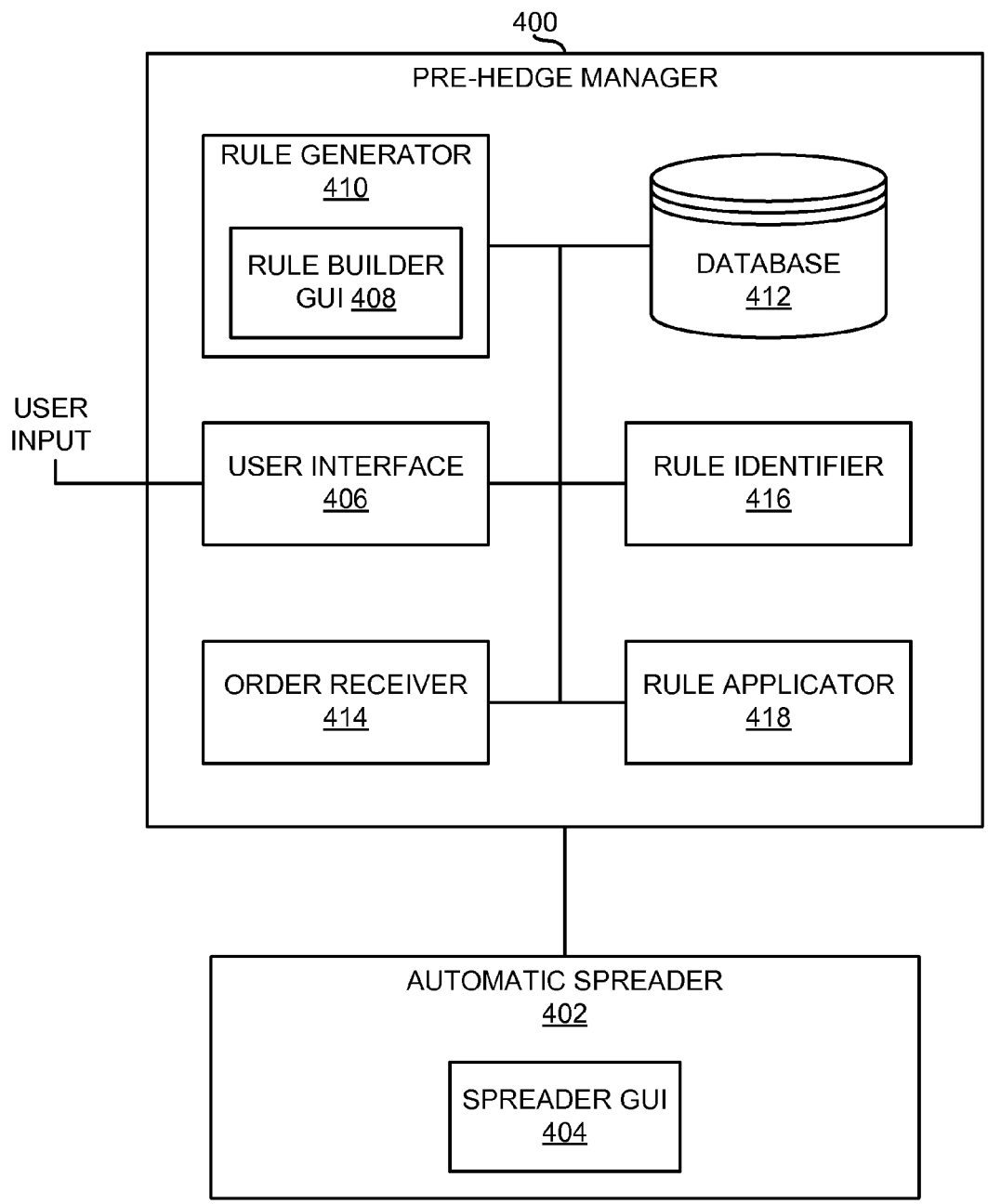
FIG. 4 illustrates a block diagram of an example apparatus that may be used to implement an example pre-hedge manager.

FIG. 4 illustrates an example pre-hedge manager 400 that may be used to implement certain embodiments disclosed herein. In certain embodiments, the example pre-hedge manager 400 of FIG. 4 is implemented on or in connection with the example trading device 110 of FIG. 1. In certain embodiments, the pre-hedge manager 400 is part of a separate computing device from the trading device 110 of FIG. 1, such as a server or gateway, for example. Similarly, an automatic spreader 402 shown in FIG. 4 can be implemented on or in connection with the example trading device 110 of FIG. 1 or as part of a separate computing device from the trading device 110. In certain embodiments, the pre-hedge manager 400 and the automatic spreader 402 are implemented as part of a single application. For example, the pre-hedge manager 400 may be integrated into the automatic spreader 402 as an add-on tool. Alternatively, the example pre-hedge manager 400 may cooperate with the automatic spreader 402 as a separate application or program. The example automatic spreader 402 includes a graphical user interface (GUI) 404 to enable communication with a user of the trading device 110 of FIG. 1. The example GUI 404 implements a plurality of features and aspects that provide a plurality of options to users of the automatic spreader 404, many of which are not described in detail here.

Figure 5:
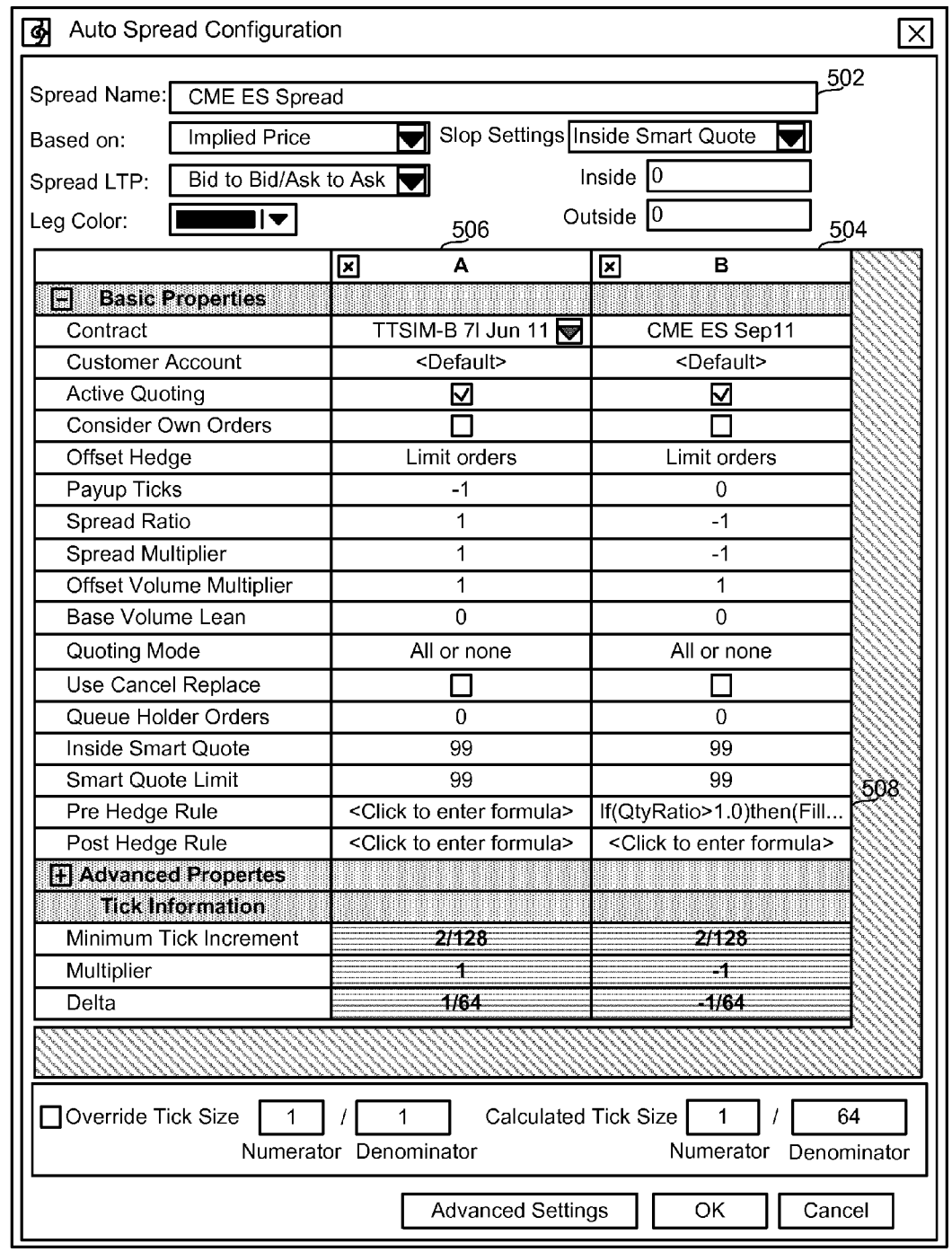
FIG. 5 illustrates a screenshot of an example spread trading configuration screen.

FIG. 5 shows an example spread configuration screen 500 implemented by the example GUI 404 of FIG. 4. The spread configuration screen 500 includes two legs, A and B, although any number of quoting and/or hedge legs may be added to the spread configuration screen 500. The spread configuration screen 500 has a plurality of spread setting parameters that can be set by a user to customize the spread trade. The spread setting parameters control the behavior of the spread as the spread is generated, displayed, traded, etc. depending on the particular parameter(s). The example spread configuration screen 500 of FIG. 5 includes a spread name portion 502 for a spread name. The spread name portion 502 may provide the name of the spread and/or the names of the underlying tradeable objects, depending on naming conventions of the user, for example. Names of the legs are displayed in leg fields 504 and 506. Alternatively, a user can personalize the spread by renaming the spread and/or the legs to have any desired name. The columns in the spread configuration screen 500 can be dragged and dropped such that the user can re-arrange the order of the legs. It will be appreciated by those skilled in the art that the parameters of FIG. 5 not described in detail herein may be flexible and/or changed as circumstances dictate because of the wide range of products that can be traded using the automatic spreader.

The example spread configuration screen 500 of FIG. 5 includes a row 508 dedicated to the example pre-hedge rules managed by the example pre-hedge manager 400 of FIG. 4. The example pre-hedge row 508 of FIG. 5 includes an entry for each leg of the spread trade configured by the example screen 500. Each entry of the pre-hedge row 508 is selectable by a user. When selected, the entries of the pre-hedge row 508 receive a formula from the user that defines a pre-hedge rule to be checked in accordance with the operations of the pre-hedge manager 400 of FIG. 4. The formula to be entered into the pre-hedge row 508 can be typed directly into the entries by the user and include one or more conditions and one or more corresponding actions. As described in detail below in connection with FIGS. 7-13, additional and alternative options to define pre-hedge rules are provided herein.

Although abbreviated in the example of FIG. 5, the pre-hedge row 508 includes a formula for an example pre-hedge rule as follows: If(QtyRatio>1.0)then(FillWithLimit)Else (Notify[Flash, Sound]). The formula may cause the corresponding pre-hedge rule to check if a quantity ratio is greater than one. If so, the pre-hedge rule causes the hedge order to be sent as a limit order at a price which should be filled according to conditions of the market at the time. If not, the pre-hedge rule causes the user to be notified by flashing an image on a display unit and playing a sound.

Another example of a pre-hedge rule is defined by the following formula: If(QtyRatio<1.0)Then(CrossInside)Else (Notify[Flash, Sound]). The formula may cause the corresponding pre-hedge rule to check if the ratio of orders between a working hedge order and an opposite inside market is less than 1. If so, the price of the hedge order is set to the inside market price of the opposite side.

Another example of a pre-hedge rule is defined by the following formula: If(OppositeQty<5.0)Then(If(HedgeWorkingQty<10.0)Then(Payup[Ticks:1,Repeat:0])Else(FillWithLimit))Else(Notify[Flash,Sound]). The formula may cause the corresponding pre-hedge rule to check if an opposite inside market quantity is less than 5. If so, a quantity of the hedge order is checked. If the working hedge order has a quantity less than 10, the hedge price is moved or ticked one level up. If the working hedge order has a quantity more than 10, the hedge price such that the hedge order can be filled as soon as possible.

As demonstrated above, any aspect of a hedge order can be re-evaluated and/or adjusted at the additional decision provided by the example pre-hedge rules managed by the example pre-hedge manager 400 disclosed herein. Other conditions to be checked in connection with the pre-hedge rules include, for example, a hedge target price, a net change, settlement costs, an average hedge fill price, whether the spread trade will be legged, evaluating the market of a different contract, looking at any number of fields in the current contract or contracts in the spread or anything else that could be useful to the trader when placing the hedge order. Other actions to be taken in connection with the pre-hedge rules include, for example, sending a text message regarding details of the spread to a device associated with the user, changing the tradeable object to be traded as part of the hedge, sending a hedge order to a different exchange than originally designated for the hedge order (e.g., sending a hedge order to ICE; not CME), splitting the hedge order (for example, by sending 5 of a 10 lot hedge at a calculated price and 5 with –2 payups), cancelling the hedge order, reverse filling or trading out the hedge order, sending an audit trail message, overriding a type (market or limit) of the hedge order.

Figure 6:
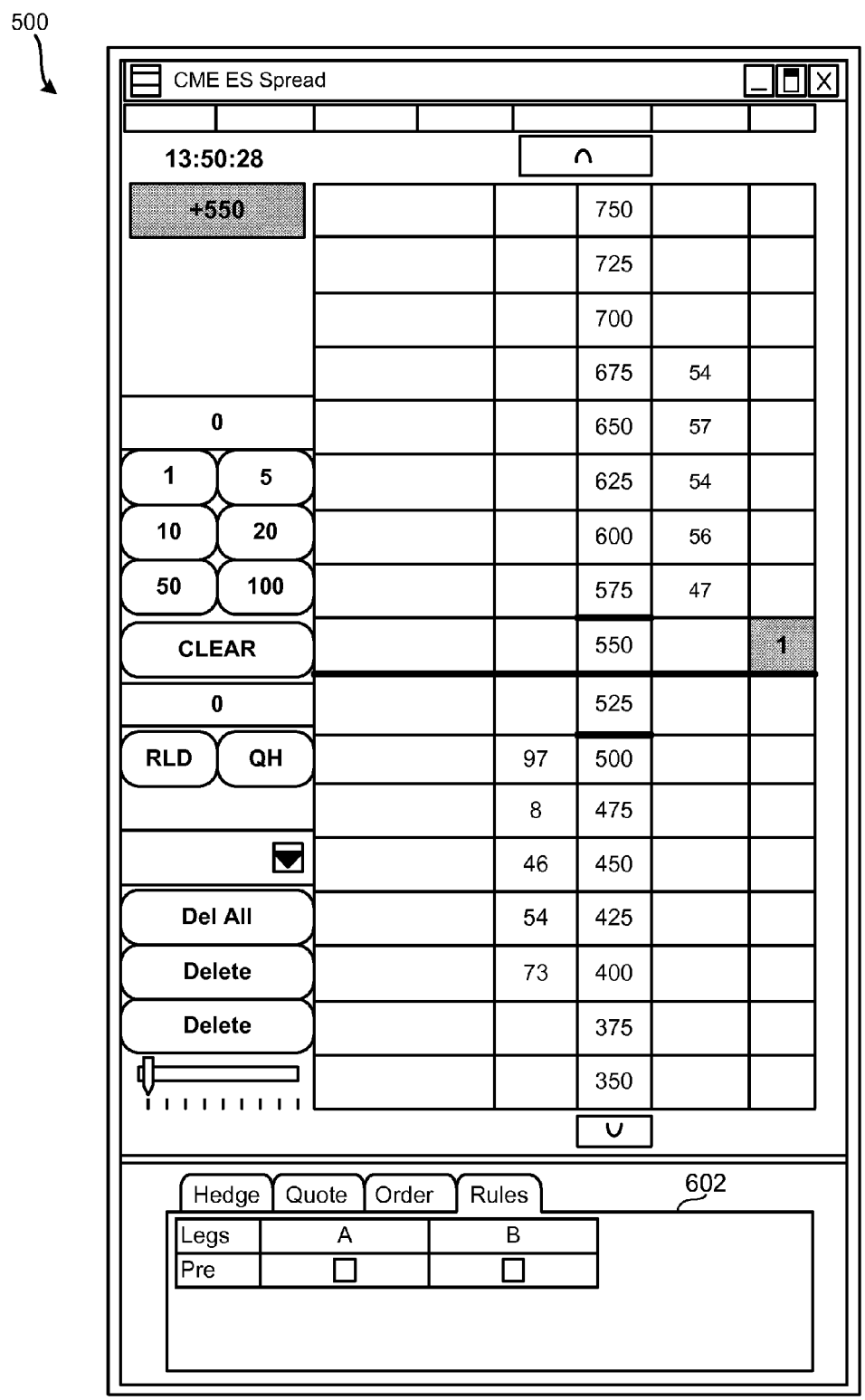
FIG. 6 illustrates a screenshot of an example trade order screen.

When the example spread configuration screen 500 of FIG. 5 is configured to define a spread trade and has one or more formulas entered into the pre-hedge row 508 of one or more of the legs 504, 506, the pre-hedge rule(s) corresponding to the formulas are activated for that particular spread trade. FIG. 6 shows another example option to activate a pre-hedge rule. In particular, FIG. 6 is a screenshot of an example trade order screen 600 that can be used to place one or more trade orders and, if the user desires, to request activation of one or more pre-hedge rules associated with the trade order(s) placed in connection with the trade order screen 600. In certain embodiments, the trade order screen 600 is part of a trading application that includes a price axis for order entry. The example trade order screen 600 can be presented on the trading device 110 of FIG. 1, for example. The example trade order screen 600 includes a plurality of options and inputs to configure a trade order such as, for example, quantity buttons to be selected for placement of a quantity adjacent to a price in a price column. The example trade screen 600 of FIG. 6 includes a table 602 including selectable options corresponding to pre-hedge rules. A user can select one or more of the options of the table 602 to activate pre-hedge rule(s) defined in connection with the corresponding trade orders. Thus, the example pre-hedge rules managed by the example pre-hedge manager 400 of FIG. 4 can be activated in a plurality of manners, including the examples shown in FIGS. 5 and 6.

Referring back to FIG. 4, the example pre-hedge manager 400 of FIG. 4 provides an option to users of, for example, the trading device 110 (and/or the automatic spreader 402), to define and/or apply one or more pre-hedge rules to one or more legs of a spread trade. The example pre-hedge manager 400 implements a user interface 406 capable of receiving information from and presenting information to a user of the trading device 110 of FIG. 1. For example, the user interface 406 may be used by a trader to define a pre-hedge rule to be selectably applied to spread trades implemented by the automatic spreader 402. To receive information, the example user interface 406 implements one or more selection, configuration, and/or input screens. For example, the user interface 406 cooperates with a rule builder graphical user interface (GUI) 408 to build pre-hedge rules. The example rule builder GUI 408 is described in detail below in connection with FIGS. 7-13.

The example rule generator 410 of FIG. 4 receives information from, for example, the rule builder 408 that defines pre-hedge rules. The example rule generator 410 receives the user-provided information and formats and/or translates the received formulas into data executable by, for example, the trading device 110 to implement the pre-hedge rules. The example rule generator 410 stores the pre-hedge rules in a database 412. In some examples, the rule generator 410 verifies logic (according to, for example, syntax requirement) of the user-provided information before storing the rules in the database 412. Thus, users of the example pre-hedge manager 400 can build a collection of pre-hedge rule in the database 412 that are selectable via, for example, the trading device 110 and/or the automatic spreader 402.

In the illustrated example of FIG. 4, the pre-hedge manager 400 receives spread trade information of a spread strategy via an order receiver 414. The example order receiver 414 of FIG. 4 receives data from the automatic spreader 402 regarding a spread trade being implemented by the automatic spreader 402. In the illustrated example of FIG. 4, the automatic spreader 402 utilizes the pre-hedge manager 400 to incorporate one or more selected pre-hedge rules of the database 412.

The information received at the order receiver 414 is conveyed to a rule identifier 416. The example rule identifier 416 determines which pre-hedge rules were selected to be active in the spread trade received at the order receiver 414. In some examples, the pre-hedge rules are each associated with a unique identifier. The unique identifier is tied to a user-friendly name or label that can be selected by the user utilizing the spread trade. In such instances, the example rule identifier 416 extracts the unique identifier and using the extracted information to query the database 412. The database 412 returns the selected pre-hedge rule to a rule applicator 418.

The example rule applicator 418 executes the selected pre-hedge rules on the spread trade. The example rule applicator 418 may receive market information from, for example, the automatic spreader 402 and/or directly from the exchange 130 of FIG. 1 regarding the status of the different aspects of the spread trade. For example, the rule applicator 418 receives an indication of whether a quoting leg of the spread trade has been filled and the details of the fill of the quoting order, such as an amount and price at which the quoting leg was filled. When the rule applicator 418 determines that the quoting order has been filled or at least partially filled, the rule applicator 418 checks for the condition(s) defined in the active pre-hedge rule(s). For example, the rule applicator 418 may identify details of the filled quoting leg, market conditions at the moment before the hedge order is to be placed, ratios of the hedge order to be placed and market conditions (for example, an inside market level), etc.

In light of whether the conditions checked by the rule applicator 418 are present, the rule applicator 418 takes the action(s) defined in the active pre-hedge rules. In some examples, taking the defined action(s) includes sending instructions to the automatic spreader 402 to adjust a hedge order, wait to place a hedge order until other condition(s) are present, to cancel a hedge order, etc. The example rule applicator 418 can check the pre-hedge condition(s) and take the pre-hedge action(s) until the hedge order is completed, which may include the cancellation of the hedge order.

Figure 7:
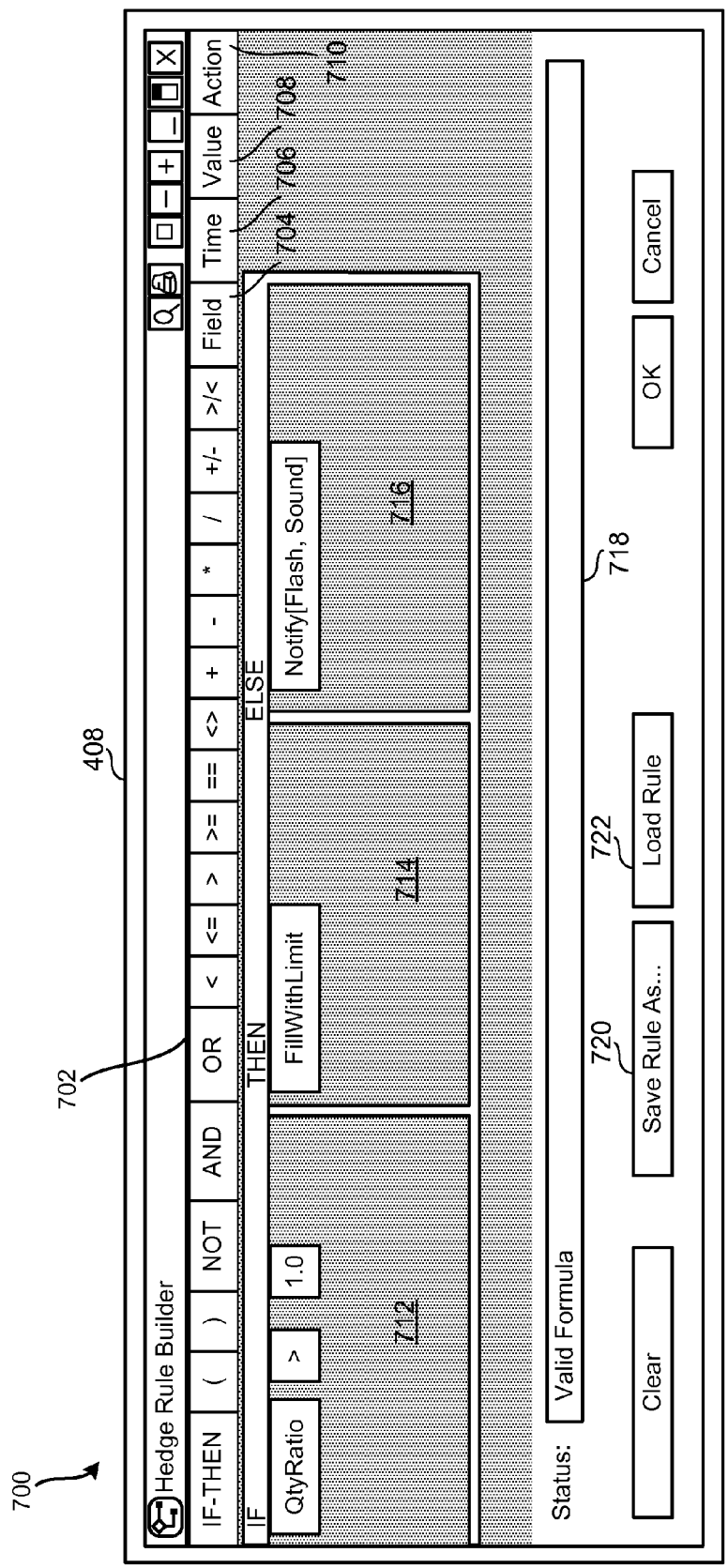
FIG. 7 illustrates a first screenshot associated with the example rule builder graphical user interface (GUI) of FIG. 4.

FIG. 7 illustrates a first screenshot 700 associated with the example rule builder GUI 408 of FIG. 4. The example rule builder GUI 408 includes a plurality of pre-defined operators 702 to be used in a formula defining a pre-hedge rule. The example operators 702 includes mathematical operators, such as "+", "−", "*", etc. and logical operators, such as "AND", "NOT", "OR" etc. The example rule builder GUI 408 of FIG. 7 also includes a field button 704, a time button 706, a value button 708, and an action button 710. The example rule builder GUI 408 of FIG. 7 also includes an IF portion 712, a THEN portion 714, and an ELSE portion 716, which are collectively referred to herein as the statement portions.

Each of the statement portions of the example rule builder GUI 408 of FIG. 7 can be selected by the user to receive one or more of the operators 702, a field corresponding to the field button 704, a time corresponding to the time button 706, a value corresponding to the value button 708, and/or an action corresponding to the action button 710. As a whole, the operators, fields, times, values, and/or actions entered into the statement portions define a formula to be used as a pre-hedge rule by the example pre-hedge manager 400 of FIG. 4.

Figure 8:
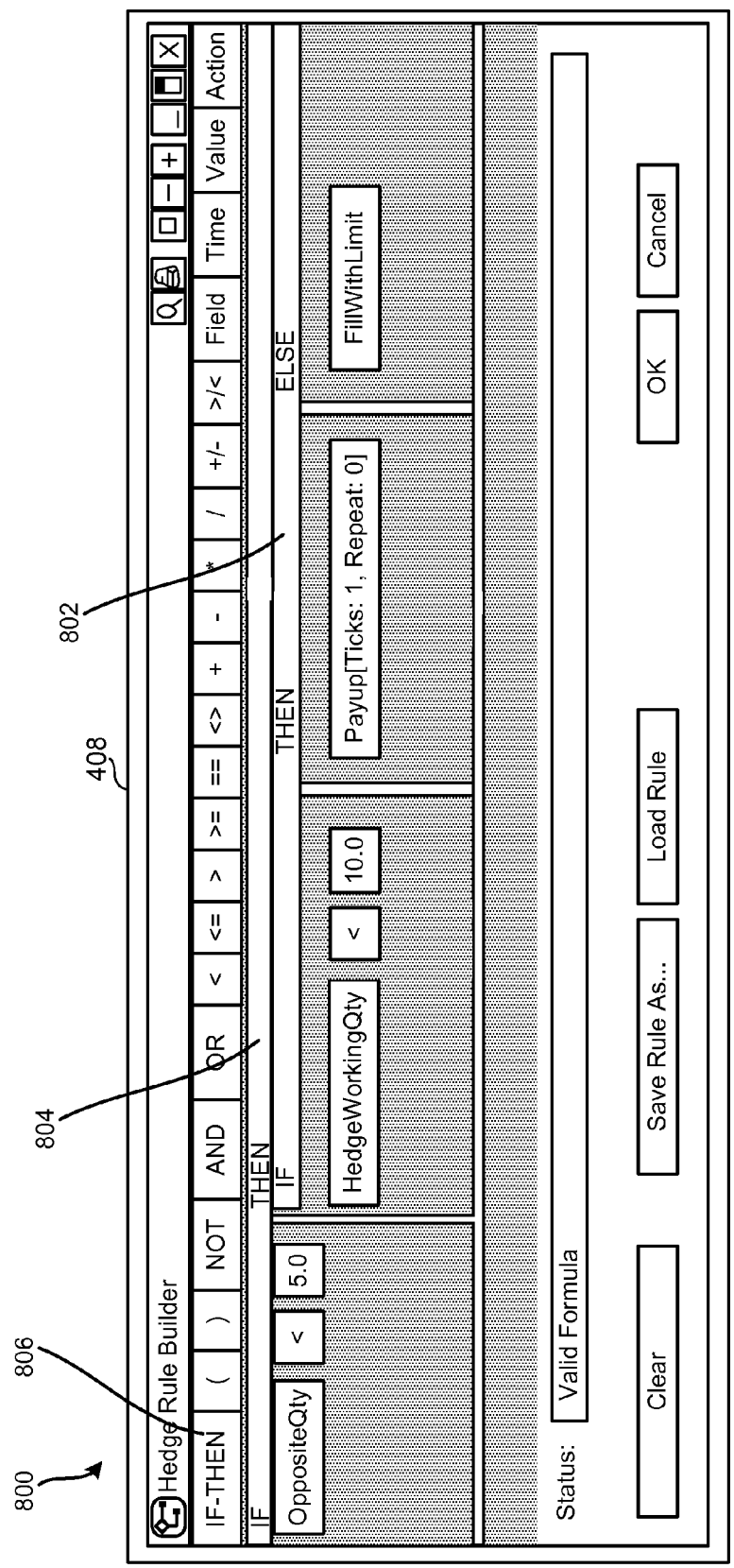
FIG. 8 illustrates a second screenshot associated with the example rule builder GUI of FIG. 4.

The example of FIG. 7 shows a basic IF-THEN-ELSE formula to define a pre-hedge rule. FIG. 8 is a screenshot 800 of the example rule builder GUI 408 have a more complex formula entered therein. In particular, the example screenshot 800 of FIG. 8 shows a nested IF-THEN-ELSE statement 802. The THEN portion of a parent IF-THEN statement 804 is selected by the user to include the nested IF-THEN statement 802. In the illustrated example of FIG. 8, the nested IF-THEN statement 802 is added by selecting an IF-THEN button 806 while the THEN portion is selected to receive input.

Referring back to FIG. 7, as described above, the example rule generator 410 may check the logic of the formula defining a pre-hedge rule. In the illustrated example of FIG. 7, the result of this check is shown in a status portion 718. The example GUI 408 of FIG. 7 also includes a SAVE button 720 to enable the user to save the currently entered formula into the database 412 as a pre-hedge rule. The example GUI 408 of FIG. 7 also includes a LOAD button 722 to enable the user to load a previously saved pre-hedge rule into the GUI 408. For example, the user may want to edit an existing pre-hedge rule of the database 412. If so, the LOAD button 722 can be engaged to present the user with a list of existing pre-hedge rules of the database 412.

Figure 9:
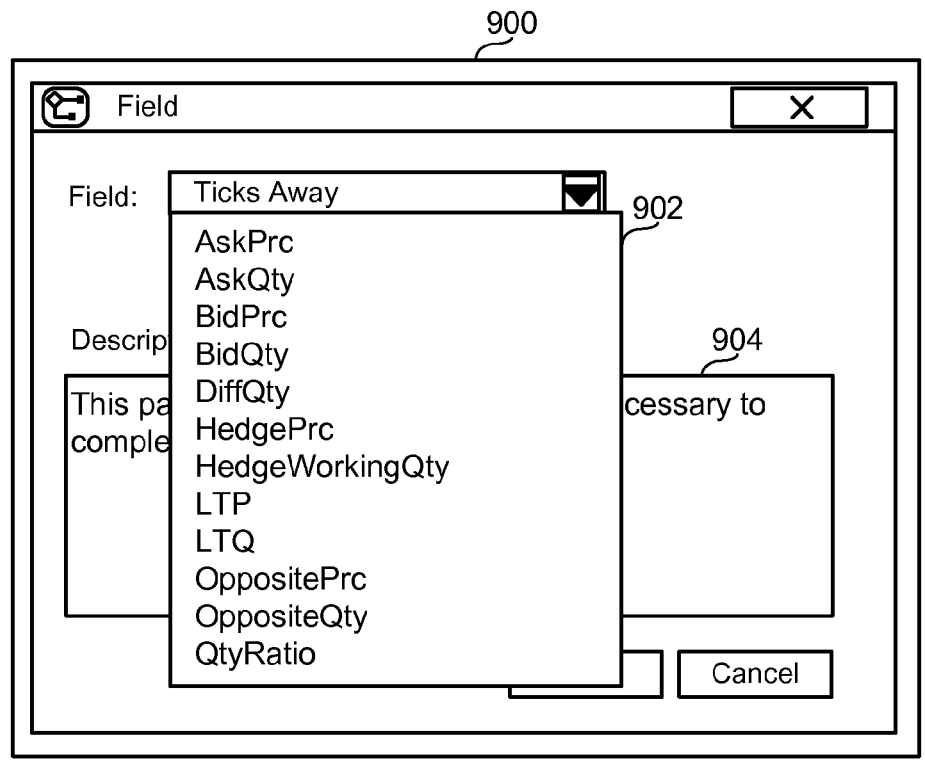
FIG. 9 illustrates a third screenshot associated with the example rule builder GUI of FIG. 4.

A screenshot of an example window 900 that can be displayed upon selection of the field button 704 is shown in FIG. 9. The example window 900 of FIG. 9 includes a drop-down menu 902 including a plurality of field options that can be selected as part of the formula to be entered into the example GUI 408 of FIG. 7. The example options for fields to be inserted into the pre-hedge rule formula include an asking price (AskPrc), an asking quantity (AskQty), a bid price (BidPrc), a bid quantity (BidQty), a quantity difference (DifQty), a hedge price (HedgePrc), a hedge working quantity (HedgeWorkingQty), an LTP, an LTQ, an opposite price (OppositePrc), an opposite quantity (OppositeQty), and a quantity ration (QtyRatio). Each of the fields corresponds to a condition that can be checked as part of the pre-hedge rule being defined by the formula. The example window 900 of FIG. 9 also includes a description portion 904 that includes a brief description of the condition corresponds to a currently selected one of the field options of the drop-down menu 902.

Figure 10:
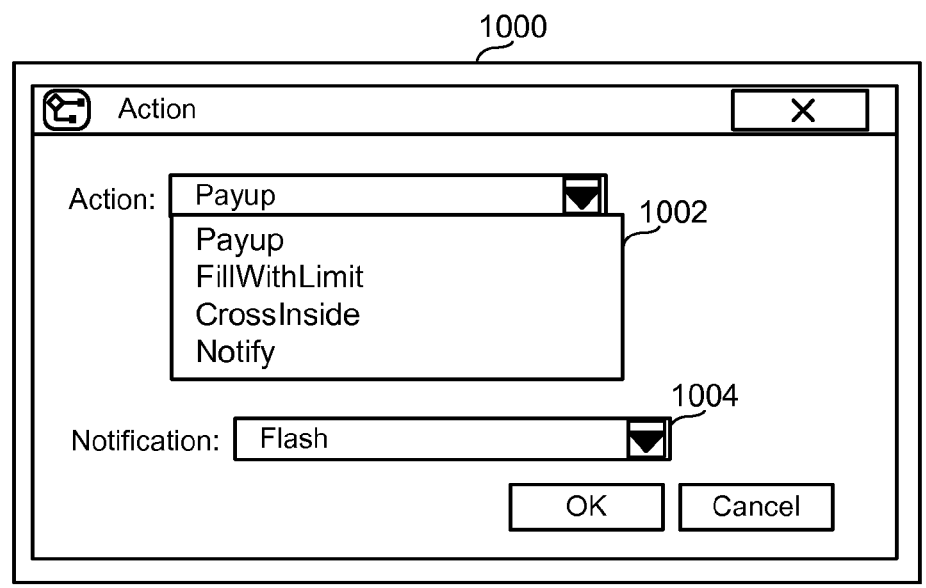
FIG. 10 illustrates a fourth screenshot associated with the example rule builder GUI of FIG. 4.

A screenshot of an example window 1000 that can be displayed upon selection of the action button 706 is shown in FIG. 10. The example window 1000 of FIG. 10 includes a drop-down menu 1002 including a plurality of action options that can be selected as part of the formula to be entered into the example GUI 408 of FIG. 7. The example options for action to be inserted into the pre-hedge rule formula include payup option, a fill with limit option, a cross inside option, and a notify action. Each of the actions corresponds to an action that can be taken as part of the pre-hedge rule being defined by the formula. The example window 1000 of FIG. 10 also includes a notification menu 1004 that includes a plurality of notification options that correspond to the notify option of the action drop-down menu 1002. Thus, if the notify option is selected from the action drop-down menu 1002, the notification drop-down menu 1004 is used to designated a type of notification to be taken as the action. For example, an image may be flashed on a screen, a text message can be sent to the user, an email can be sent to the user, a sound can be played to the user, etc. as a notification of an existing condition (for example, one of the conditions designated in connection with the field options of FIG. 9).

Figure 11:
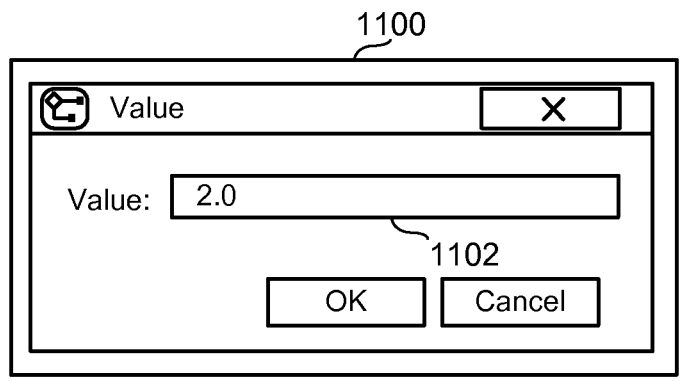
FIG. 11 illustrates a fifth screenshot associated with the example rule builder GUI of FIG. 4.

A screenshot of an example window 1100 that can be displayed upon selection of the value button 708 is shown in FIG. 11. The example window 1100 of FIG. 11 includes a field 1102 into which a value can be entered for inclusion in the formula to be entered into the example GUI 408 of FIG. 7. A similar window to the example window 1100 of FIG. 11 can be used in connection with the time button 710 of FIG. 7.

Figure 12:
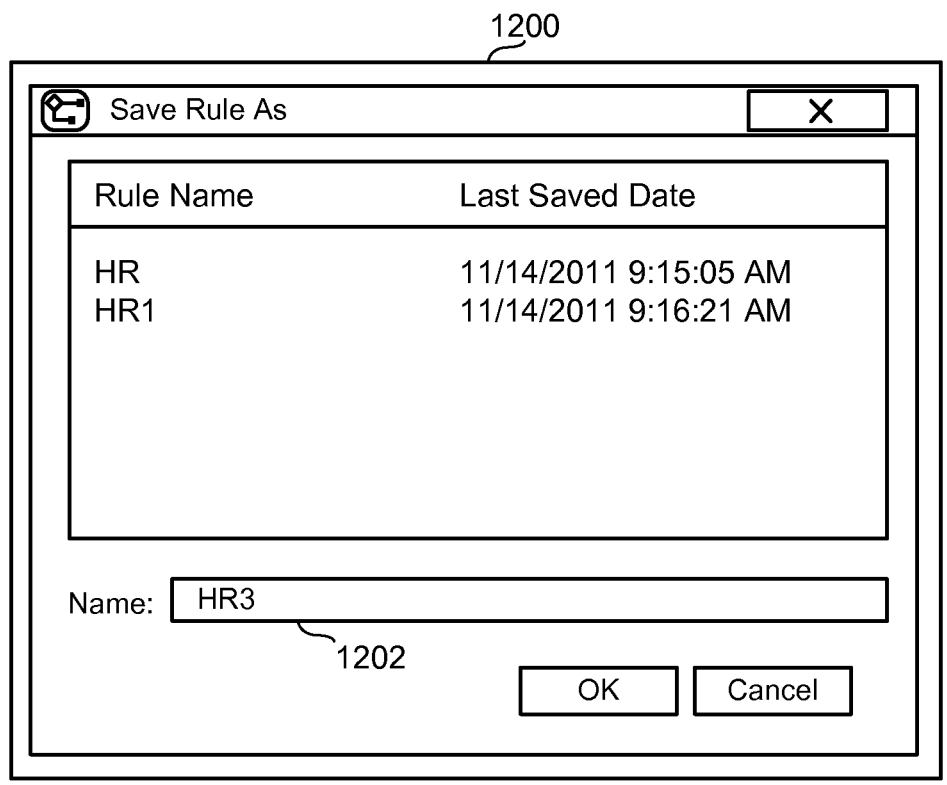
FIG. 12 illustrates a sixth screenshot associated with the example rule builder GUI of FIG. 4.

A screenshot of an example window 1200 that can be displayed upon selection of the Save button 720 is shown in FIG. 12. The example window 1200 of FIG. 12 includes a name field 1202 into which a name for the currently entered formula can be entered. With the name for the rule entered into the field 1202, the OK button can be selected to save the current formula as a pre-hedge rule in the database 412 of FIG. 4.

Figure 13:
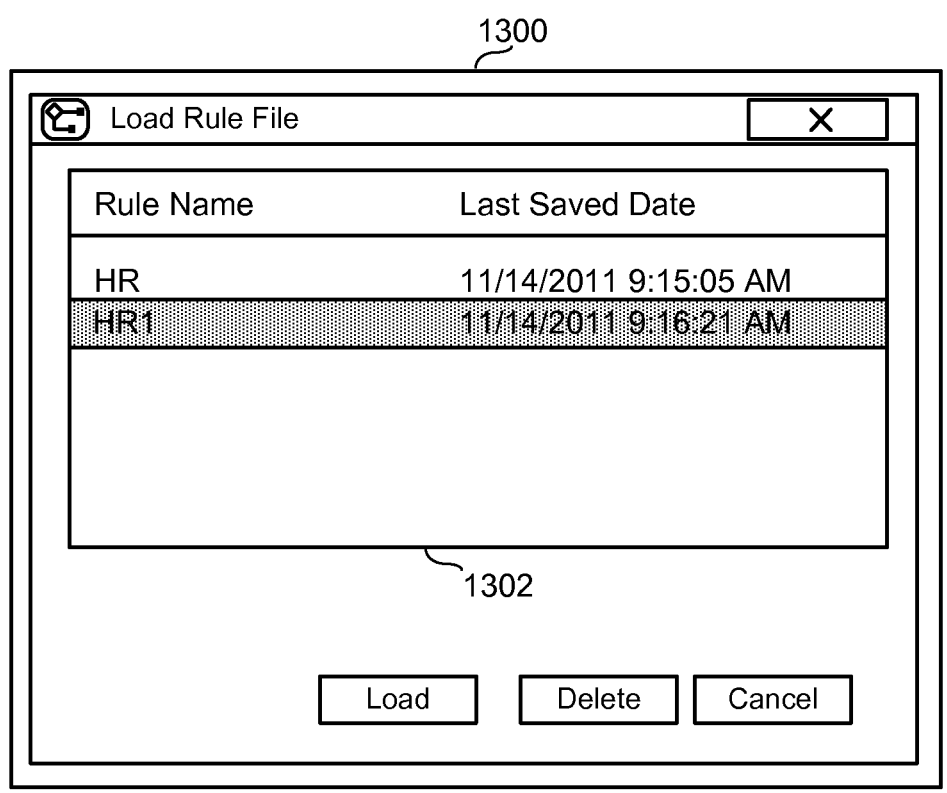
FIG. 13 illustrates a seventh screenshot associated with the example rule builder GUI of FIG. 4.

A screenshot of an example window 1300 that can be displayed upon selection of the Load button 722 is shown in FIG. 13. The example window 1300 of FIG. 13 includes a list 1302 from which a pre-hedge rule stored in the database 414 of FIG. 4 can be selected for loading into the example rule builder 408 of FIGS. 7 and/or 8. The selected pre-hedge rule can then be edited, for example.

Figure 14:
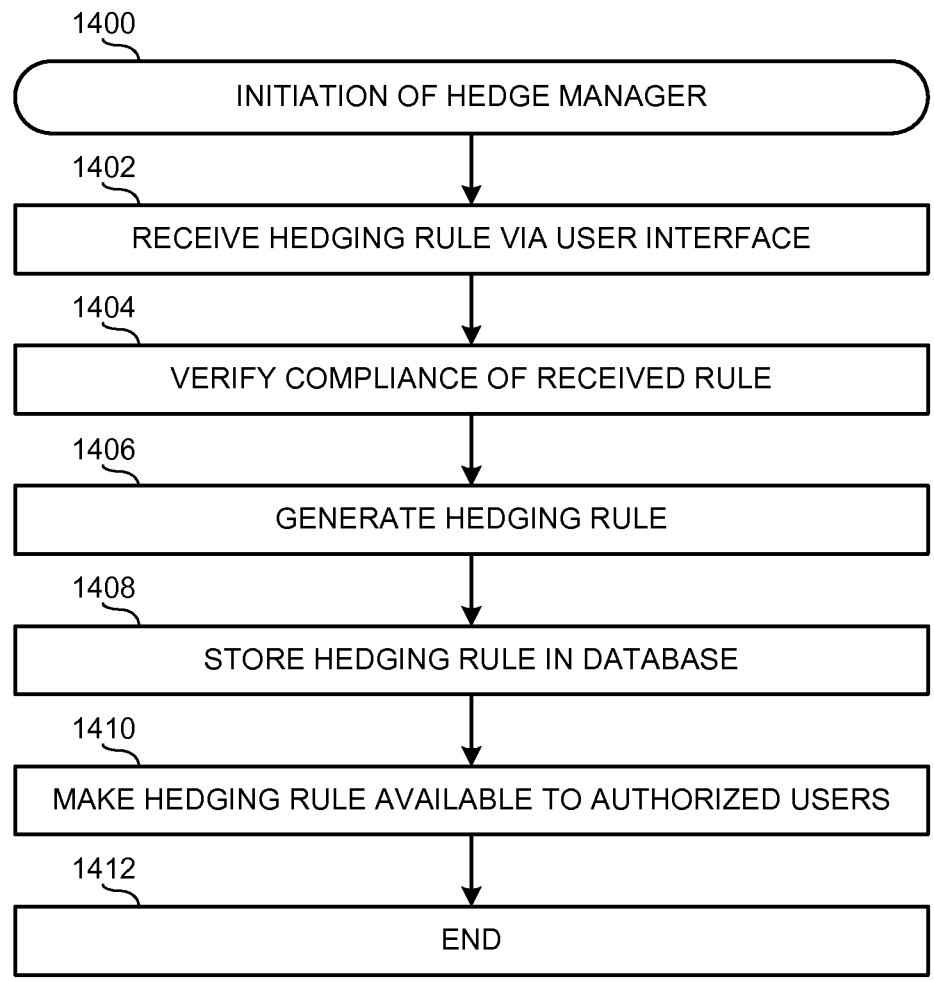
FIG. 14 is a first flow diagram illustrative of machine readable instructions that may be executed to implement the example pre-hedge manager of FIG. 4.

FIG. 14 is a block diagram illustrating an example method of implementing the example pre-hedge manager 400 of FIG. 4. The example begins with an initiation of the hedge manager 400 (block 1400). Such an initiation may correspond to execution of the pre-hedge manager 400 on the trading device 110 of FIG. 1. In the illustrated example, the GUI 408 of the rule generator 406 is initiated and receives a pre-hedging rule from a user of the hedge manager 400 (block 1402). Alternatively, the pre-hedging rule may be received via, for example, the user typing a formula into one of the entries of the pre-hedge row 508 of the automatic spread configuration screen 500 of FIG. 5. The formula provides one or more conditions to check before submitting a leg of a spread trade and one or more actions to take in case the condition(s) of the formula are present.

In the illustrated example, the integrity of the received pre-hedging rule is verified by the rule generator 410 of FIG. 4 (block 1404). For example, the rule generator 410 may determine whether a received formula is logical and/or contains operators that logically interact. If the formula is valid, the example rule generator 410 converts the received formula into a pre-hedge rule (block 1406). The resulting pre-hedge rule is then stored in the database 412 (block 1408). The example pre-hedge manager 400 then makes the pre-hedge available to users for selection (block 1410). For example, the pre-hedge manager 400 adds the pre-hedge rule to the list 1302 of FIG. 13. The example of FIG. 14 then ends (block 1412).

Figure 15:
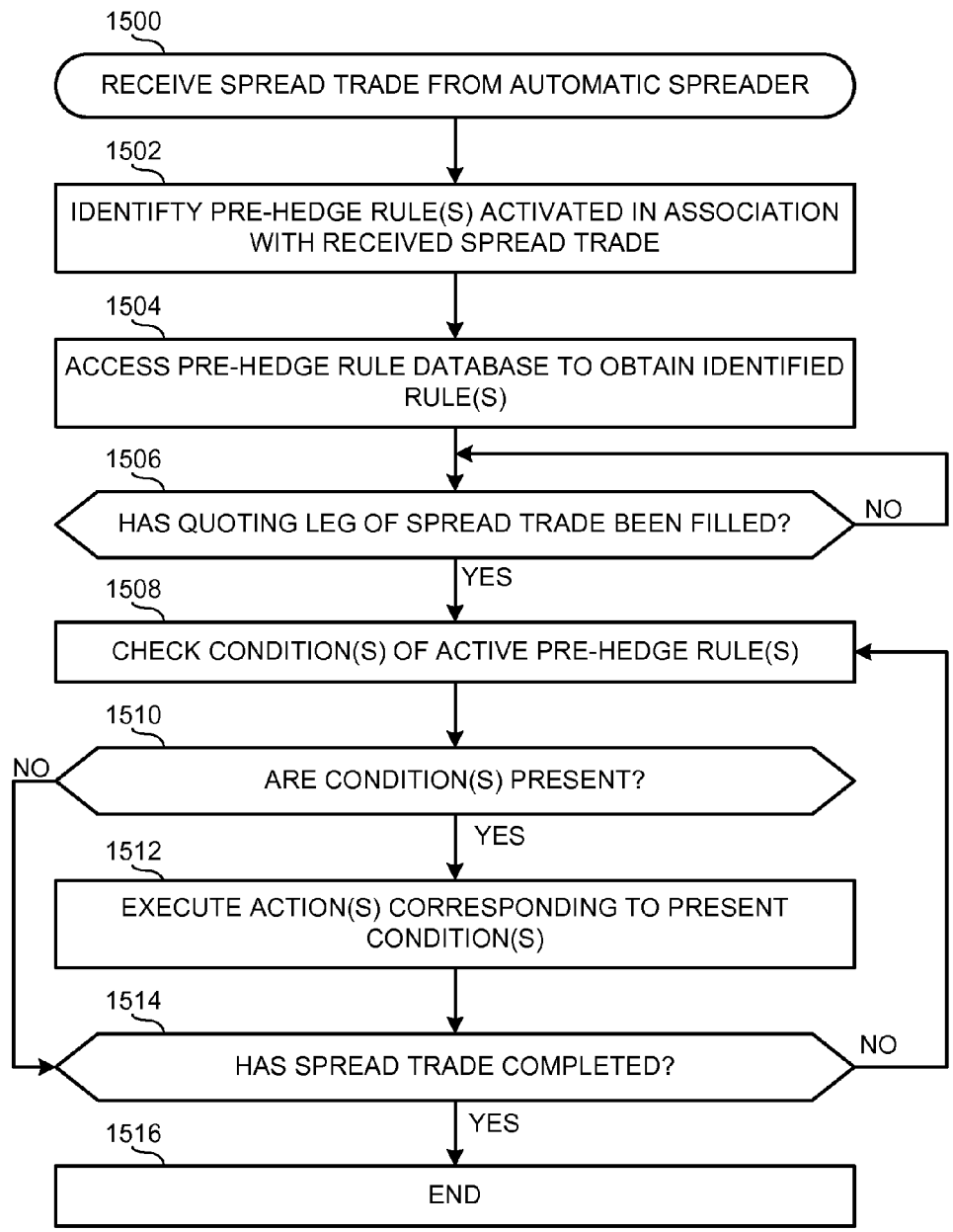
FIG. 15 is a second flow diagram illustrative of machine readable instructions that may be executed to implement the example pre-hedge manager of FIG. 4.

FIG. 15 is another block diagram illustrating an example method of implementing the example pre-hedge manager 400 of FIG. 4. The example begins with a receipt of a spread trade at the order receiver 414 of the example pre-hedge manager 400 (block 1500). In the illustrated example, the spread trade is received from the automatic spreader 402 of FIG. 4. In the illustrated example of FIG. 15, the received spread trade includes one quoting leg and one hedge leg. However, the example pre-hedge manager 400 can be applied to spread trades having additional or alternative configurations, amounts of quoting legs, amounts of hedge legs, etc. The spread trade received at the order receiver 414 is conveyed to the pre-hedge manager 400 because at least one pre-hedge rule is active in the spread trade. The example rule identifier 414 determines which of the pre-hedge rules of the database 412 are active in connection with the received spread trade (block 1502). Further, the database 412 is accessed to obtain the identified pre-hedge rules (block 1504). The active pre-hedge rule(s) are conveyed to the example rule applicator 418 of FIG. 4.

The example rule applicator 418 determines whether a quoting leg of the received spread order has been at least partially filled (block 1506). In some examples, the rule applicator 418 determines whether the entire quoting leg is filled. If the quoting leg has not been at least partially filled (block 1506), the rule applicator 418 again determines whether the quoting leg has been at least partially filled. Otherwise, the at least partial fill of the quoting leg triggers a check of the active pre-hedge rule(s). In particular, the rule applicator 418 responds to a fill of the quoting leg by checking the one or more conditions of the active pre-hedge rules (block 1508). If none of the condition(s) of the active pre-hedge rules are present (block 1508), the rule applicator 418 determines whether the spread trade has been completed (block 1514). If so, the example of FIG. 15 ends (block 1516). Otherwise, control returns to block 1508.

Referring back to block 1508, if one or more of the condition(s) are present, the rule applicator 418 executes the one or more actions associated with the present condition(s) (block 1512). Control then passes to block 1514.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method including:
receiving by an electronic trading device an indication that a first leg of a spread trade is at least partially filled; and
in response to the indication and before an order associated with a second leg of the spread trade is placed:
determining by the electronic trading device whether a condition defined in a pre-hedge rule for the spread trade is satisfied; and
when the condition is satisfied, performing by the electronic trading device an action defined in the pre-hedge rule for the spread trade.

2. The method of claim 1, wherein the first leg is a quoting leg and the second leg is a hedge leg.

3. The method of claim 2, wherein the action includes adjusting one or more aspects of the hedge order.

4. The method of claim 1, wherein the condition corresponds to a market condition.

5. The method of claim 1, wherein the condition corresponds to an aspect of the fill of the first leg.

6. The method of claim 1, further including generating by the electronic trading device a graphical user interface including one or more operators selectable to define the condition and the action of the pre-hedge rule for the spread trade.

7. The method of claim 6, where the pre-hedge rule for the spread trade is modifiable via the graphical user interface.

8. The method of claim 1, wherein the pre-hedge rule for the spread trade is selectable by a user to apply to the spread trade.

9. A non-transitory tangible computer readable storage medium including instructions that, when executed, cause a computing device to at least:
receive an indication that a first leg of a spread trade is at least partially filled; and
in response to the indication and before an order associated with the second leg of the spread trade is placed:
determine whether a condition defined in a pre-hedge rule for the spread trade is satisfied; and
when the condition is satisfied, perform an action defined in the pre-hedge rule for the spread trade.

10. The non-transitory computer readable storage medium of claim 9, wherein the first leg is a quoting leg and the second leg is a hedge leg.

11. The non-transitory computer readable storage medium of claim 10, wherein the action includes adjusting one or more aspects of the hedge order.

12. The non-transitory computer readable storage medium of claim 9, wherein the condition corresponds to a market condition.

13. The non-transitory computer readable storage medium of claim 9, wherein the condition corresponds to an aspect of the fill of the first leg.

14. The non-transitory computer readable storage medium of claim 9, further including instructions that, when executed, cause the computing device to present a user with a graphical user interface including one or more operators selectable to define the condition and the action of the pre-hedge rule for the spread trade.

15. The non-transitory computer readable storage medium of claim 14, further including instructions that, when executed, cause the computing device to enable the user to edit the pre-hedge rule for the spread trade via the graphical user interface.

16. An apparatus including:
- an data receiver configured to receive an indication that a first leg of a spread trade is at least partially filled; and
- an electronic processor coupled with the data receiver and configured to, in response to the indication and before an order associated with a second leg of the spread trade is placed:
  - determine whether a condition defined in a pre-hedge rule for the spread trade is satisfied; and
  - when the condition is satisfied, perform an action defined in the pre-hedge rule for the spread trade.

17. The apparatus of claim 16, further including a pre-hedge rule for the spread trade generator to receive input from a user related to the condition and the action and to generate the pre-hedge rule for the spread trade based on the input.

18. The apparatus of claim 17, further including a graphical user interface associated with the pre-hedge rule for the spread trade generator to communicate with the user to receive the input.

19. The apparatus of claim 18, wherein the graphical user interface associated with the pre-hedge rule for the spread trade generator provides one or more pre-defined operators for use in a formula that defines the pre-hedge rule for the spread trade.

20. The apparatus of claim 16, wherein the action includes adjusting one or more aspects of a hedge order for the spread trade.

21. The apparatus of claim 16, wherein the condition corresponds to an aspect of the fill of the first leg or a market condition.

* * * * *